Patented Apr. 25, 1933

1,905,354

UNITED STATES PATENT OFFICE

ERNEST SACK, OF NEUILLY, FRANCE, ASSIGNOR TO COMPAGNIE NATIONALE DE MATIERES COLORANTES ET MANUFACTURES DE PRODUITS CHIMIQUES DU NORD REUNIES, ETABLISSEMENTS KUHLMANN, OF PARIS, FRANCE, A CORPORATION OF FRANCE

DIAZO-COMPOUND OF 2-AMINO-CHLORO-1-OXY-3-SULPHOBENZENE AND ITS PRODUCTION

No Drawing. Application filed August 1, 1928, Serial No. 296,864, and in France August 5, 1927.

My invention relates to a diazo-compound of 2 amino 5 chloro-1-oxy-3 sulphobenzene, the coloring materials deriving therefrom as well as their metal compounds and to their process of preparation.

In my French Patent No. 235,443, of April 12, 1927, which covers a diazo-compound of 2 amino 5 chlorophenol, mordant dyestuffs derived therefrom, as well as their metal compounds and processes for their preparation, I disclosed a new body or diazo-compound of 2 amino 5 chlorophenol which enables azotized chromatable coloring materials particularly suitable to the dyeing industry to be obtained.

I have discovered, according to my present invention, that dyestuffs may be prepared having the same properties and likewise giving products of transformation in the form of metal compounds by starting with 2 nitro 4 chloro-6 sulpho-1 amino benzene, diazotizing this body in the usual manner and then reacting with an alkali such as crystallized sodium acetate (as in the example given below), on the diazo-compound thus obtained.

The product of the reaction is a new body or diazo-compound of 2 amino 5 chloro-1 oxy-3 sulphobenzene having the composition:

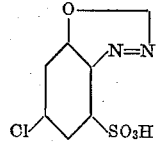

This body being the sulphonated compound of 5-chloro-2-diazobenzene-1-oxide.

The following example will suffice, in connection with the foregoing description, to enable those skilled in the art to which this invention relates to understand and practice the same.

27 kgs. of 2 nitro-4 chloro-1 amino benzene 6 sulphonate of ammonium are diazotized in the ordinary manner with 35 kgs. of 30% hydrochloric acid and 7.2 kgs. of nitrite. In the diazotized solution obtained, holding in suspension a part of the diazotized compound, 30 kgs. of crystallized sodium acetate are added and the whole is agitated at room temperature until a sample no more reacts with an alkaline solution of disulphonic betanaphthol acid (R salt), which requires about 2 or 3 hours. The solution containing the new diazo-compound is then ready for transformation into dyestuffs.

To explain how, from 2 nitro-4 chloro-1 amino-benzene-6 sulphonic acid, the formula of which is:

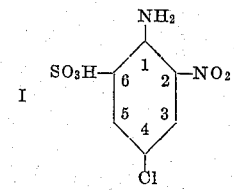

is obtained by means of successive transformations a derivative of 2 amino-5 chlorophenol (i. e. of 2 amino-5 chloro-1 oxybenzene) the formula of which is:

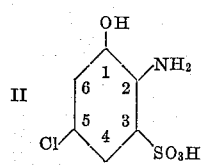

it may be stated that this results from the denomination adopted for the starting compound, which compound is, in the case of the derivative of Formula I above, the aniline (characterized by the group $NH_2$) and in the case of Formula II, the phenol (group OH). To the substituting body $NH_2$ of the aniline, the numeration 1 is given in Formula I, and in Formula II the group OH (phenol) is designated by the numeral 1.

In the case of the present invention the reaction may be represented by the following equation:—

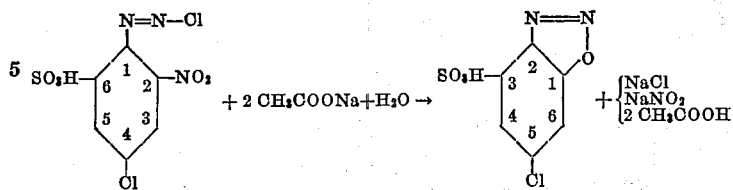

It is to be observed that the group $NO_2$— which is in position No. 2—because, by the reactions, the binding point of the group OH, to which the numeral 1 is given, since it indicates the phenolic character of the compound.

What is claimed is:—

1. A process of preparing a diazo-oxide of the type described which consists in diazotizing in the normal way 2-nitro-4-chloro-1-aminobenzene-6-sulphonic acid and reacting by means of sodium acetate upon the diazo derivative so obtained.

2. The herein described 5 chloro-3 sulpho-2 diazobenzene-1 oxide.

In testimony whereof I have signed this specification.

ERNEST SACK.